(No Model.)
C. S. BRADLEY.
ELECTRICAL TESTING.
No. 353,915. Patented Dec. 7, 1886.
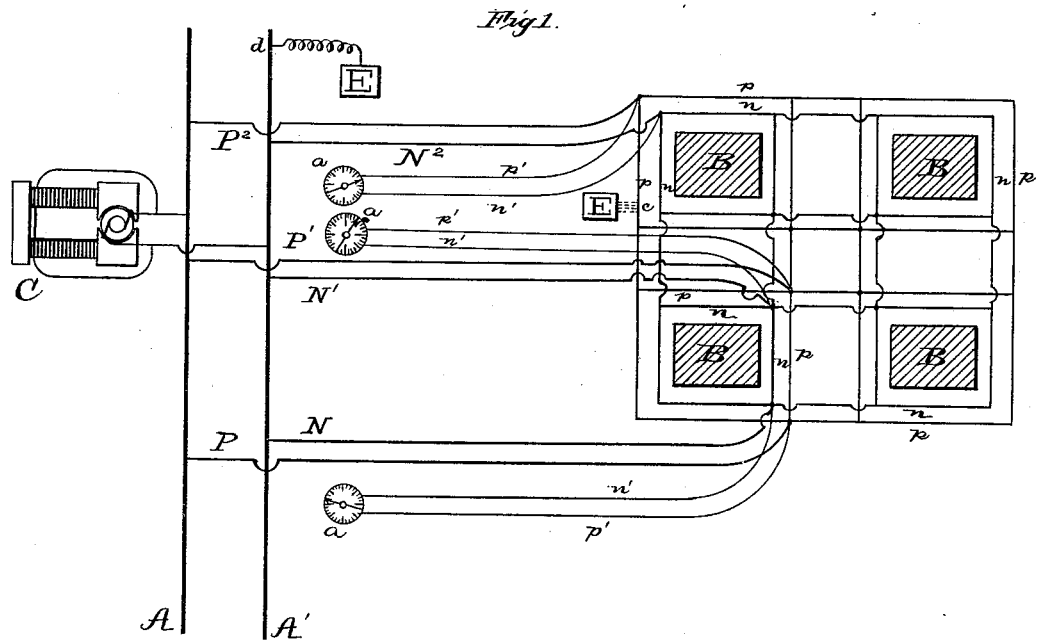
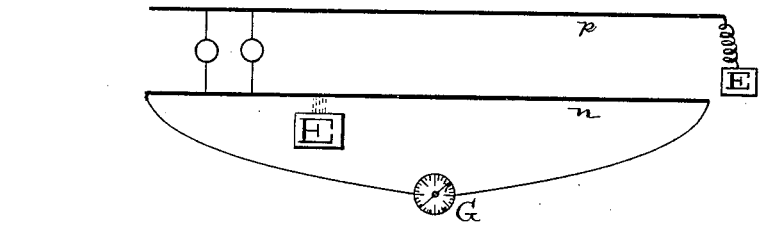
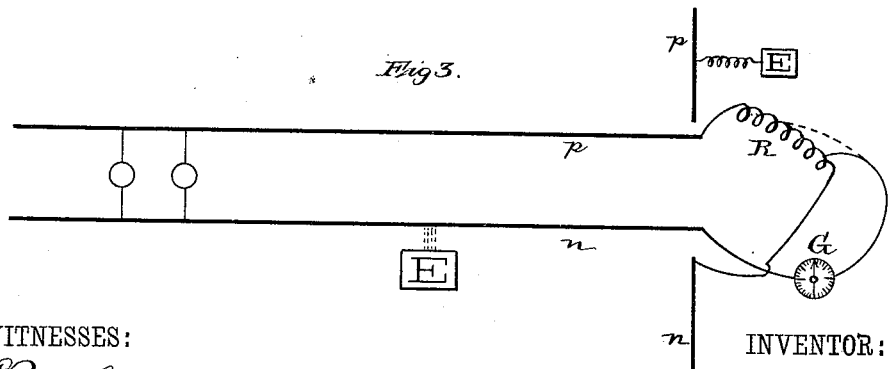
WITNESSES:
E. E. Rowland
A. W. Kiddle.
INVENTOR:
Charles S. Bradley,
By Rich'd N. Dyer,
Atty.
N. PETERS, Photo-Lithographer, Washington, D. C.

UNITED STATES PATENT OFFICE.

CHARLES S. BRADLEY, OF NEW YORK, N. Y., ASSIGNOR TO THE EDISON ELECTRIC LIGHT COMPANY, OF SAME PLACE.

ELECTRICAL TESTING.

SPECIFICATION forming part of Letters Patent No. 353,915, dated December 7, 1886.

Application filed April 5, 1884. Serial No. 126,800. (No model.)

*To all whom it may concern:*

Be it known that I, CHARLES S. BRADLEY, of New York city, in the county and State of New York, have invented a certain new and useful Improvement in Electrical Testing, of which the following is a specification.

The object of this invention is to discover the location of leaks on ground-connections in multiple-arc systems of electrical distribution, and is an improvement upon or continuation of the method of testing set forth in my Patent No. 287,501.

The system of electrical distribution in which my invention is especially applicable is one in which a system of positive and negative main conductors or "mains" is employed, such conductors extending along the faces of the blocks of the district supplied, and intersecting each other at the street-corners, and being all connected together, positive to positive and negative to negative, at each point where they intersect. The translating devices of the system are arranged in multiple arc upon these conductors or upon house-circuits derived from them. Current is supplied by a number of separate circuits, called "feeders" or "feeding-circuits," each of which extends from the source of supply to a different point in the district, at which point its conductors are respectively connected to the positive and negative conductors of one of the mains. Usually from the terminals of each feeder a circuit of fine wire returns to the central station, where it is connected with an electro-dynamometer or other suitable electrical indicating device, whereby the electrical potential at the terminals of each feeder is indicated.

In carrying out my invention I first ascertain on which side of the circuit the leak occurs and the extent of the leak, preferably in the manner set forth in the patent referred to—that is, by determining the relative values of the insulations of the two sides of the system. Having discovered this, I next ground the opposite side of the system, preferably through a resistance, so that but little current will pass. It will be seen that when the two sides of the system are grounded the reduction of resistance in the whole circuit will cause the indicating devices at the central station to be affected, and that device the terminals of whose circuit are nearest the leak will be affected to the greatest extent. If constant indicating devices are not used, the same indicator can be successively connected to the different indicator-circuits or directly across the feeding-circuits, the system being grounded each time and the relative indications noted. By this first step of my method I determine near the terminals of which feeding-circuit the leak occurs.

I next determine in which of the mains, which are laid along the faces of the blocks, the defect is present. I do this by disconnecting a main which is principally supplied from the feeder found by the first step at the end of the block nearest said feeder, thereby making its principal source of supply another feeder. If the main has a ground, the indications of ground are of course transferred from one feeder-indicator to the other. By successively trying the different mains in the vicinity of the feeder I discover which one contains the ground-connection.

It is next desired to find the precise point on the block-face at which the leak occurs. This is accomplished by finding the proportional resistance between each end of the leaking main conductor and the leak. I have devised two ways of determining this, which will be described with relation to the drawings, as they can thus be more clearly set forth.

In the drawings, Figures 1, 2, and 3 are diagrams illustrative of the different steps of my invention.

Referring first to Fig. 1, A A' are common conductors at the central station, with which one or more electrical generators, C, are connected. P N, P' N', and $P^2 N^2$ are feeding-circuits extending from the station to the centers of consumption of the district supplied, where they are connected with the main conductors $p\ n$, which intersect each other, and are connected, positive to positive and negative to negative, at the corners of the blocks B. Indicating-circuits $p'\ n'$ extend from the feeder-terminals to the central station, where they are connected with suitable indicating devices, $a\ a$. It is not necessary, however, to connect the indicating device with both conductors $p'\ n'$, for it may be connected with one of said conductors and one of the common conductors A A', being thus in a shunt through which current will pass, according to the difference of potential between the central station and the feeder-terminal. Suppose a leak or ground-connection to exist at c. The side of the system in which it occurs is determined by measuring the insulation. Then the opposite side is grounded through a resistance at d, or other convenient point. The ground-circuit thus formed makes a change in the difference of potential between the central station and the feeder-terminals, and affects the indicating devices a a. That whose circuit terminates nearest the leak will be most affected, and it will thus be seen that the leak is near the feeder $P^2$ $N^2$. I then proceed to disconnect the mains in that vicinity at their ends nearest the feeder $P^2$ $N^2$, and when the main having the leak is disconnected the indications of ground are transferred to P' N'. The main having the leak is thus indicated.

I may now use either of two methods, both of which, however, involve the same principle—viz., finding the proportionate resistances of conductors between the two ends of the leaking main and the leak. The method shown in Fig. 2 is the more simple, though that in Fig. 3 is more conveniently carried into practice.

Referring first to Fig. 2, a leak has been found to exist in conductor n of the main n p. I connect a galvanometer, G, in a shunt between the two ends of the leaking conductor, and then disconnect the main from the system, say at the end on the left of the drawings, and at any convenient point connect conductor p to ground. It will be seen that the galvanometer is thus placed in a shunt around that portion of the conductor n between its connected end and the leak, for the disconnected portion on the left of the leak will form part of the galvanometer-shunt, and current will therefore pass through the galvanometer according to the resistance of the right-hand portion of the conductor. The consequent deflection is noted. I now reconnect the main at the left hand end and disconnect it on the right, grounding conductor p as before. This shunts the galvanometer around only that part of the conductor to the left of the leak, the part on the right being thrown into the galvanometer-shunt. The deflection is noted as before. It is evident that the ratio of the two deflections is the ratio of the resistances of conductor on each side of the leak. This being determined, the operator, knowing the respective distances from each end, can at once proceed to the point at which the leak occurs. Where there are lamps or other translating devices in circuit on the main, the deflection due to the difference of potential caused by them must be taken into account and the difference between this and the whole deflection when the line is grounded noted.

The second method by which this last step of my process may be carried out is illustrated in Fig. 3. This method is advantageous, because it does away with the stringing of temporary wires along the block-face, which is inconvenient in a crowded street. By it all the operations are performed at the corner junction-box. In carrying this out I disconnect one end of the main from the system, and then connect a graduated resistance, one terminal to the conductor p and the other with the conductor n. This latter connection is preferably made through another main, n, coming from another direction, whereby the effect of slight changes in potential is avoided. The galvanometer is placed between this resistance and the end of the leaking main, its terminal being connected to such a point on the resistance that its needle will stand at zero when the current is applied at the opposite end of the main, a portion thereof passing through the galvanometer. I then ground the main p, this also being preferably done at a point electrically distant, as shown. This brings the resistance and galvanometer into a shunt around a conductor which includes that portion of main n on the left (in the drawings) of the leak, or, in fact, into the bridge-circuit of a Wheatstone bridge, and the galvanometer is deflected. I adjust the galvanometer-terminal upon the resistance until the needle is again at zero and note the portion of the resistance passed over. I now repeat this operation at the other end of the main, applying the current at the previously-disconnected end. The galvanometer and resistance are shunted when the earth-connections are made around a circuit the same as before, except that the portion of conductor on the right of the leak is included, instead of that on the left; hence the galvanometer deflections differ according to the relative resistances of these portions, and the relative extent of the adjustments of the galvanometer-terminals upon the resistance determines these resistances.

What I claim is—

1. The method of determining in which main circuit of a system, such as described, a ground-connection occurs, consisting in changing the connection of the mains from one feeder to another, whereby the leak indications are transferred from one of the indicators connected with the feeder-terminals to another when the right main is reached, substantially as set forth.

2. The method of determining the location of a ground-connection in an electrical conductor, consisting in connecting a galvanometer in a shunt around a portion of the circuit, including the conductor on one side of the leak, and then around a portion including the conductor on the other side of the leak, the different effects on the galvanometer indicating the relative distances of the leak from the ends of the conductor, substantially as set forth.

3. The method of determining the location of a ground-connection in an electrical circuit, consisting in connecting the conductor opposite to that which contains the leak to ground, and then applying current first at one end and then at the other, and noting the deflection of a galvanometer placed in a shunt between the terminals of the leaking conductor, the different deflections of the galvanometer indicating the relative distances of the leak from the ends of the conductor, substantially as set forth.

4. The method of determining the location of a leak in a main circuit of a system, such as described, consisting in connecting the conductors through a galvanometer, grounding the conductor opposite to the ground-connected one, and applying the current first at one end of the circuit and then at the other, the different deflections of the galvanometer indicating the relative distances of the leak from the ends of the conductor, substantially as set forth.

5. The method of determining the location of a ground-connection in a system, such as described, consisting in first determining on which side of the system the leak occurs, then grounding the opposite side of the system, whereupon the relative effect on indicating devices connected with the feeder-terminals determines near which feeder is the leak, then disconnecting mains successively from the feeder thus determined, whereupon the transferring of the leak indications from one of said indicators to another shows which of said mains contains the leak, and then connecting a galvanometer in a shunt first around a portion of this main circuit, including the portion on one side of the leak of the conductor containing it, and then around a portion of the circuit, including the portion of conductor on the other side, the different effects on the galvanometer indicating the relative distances of the leak from the ends of the conductor.

This specification signed and witnessed this 6th day of February, 1884.

CHARLES S. BRADLEY.

Witnesses:
H. W. SEELY,
ALFRED W. KIDDLE.